(12) United States Patent
Gudimetla

(10) Patent No.: US 8,458,704 B2
(45) Date of Patent: Jun. 4, 2013

(54) SYSTEM AND METHOD FOR AN IMPROVED MERGE UTILITY

(75) Inventor: Dharmendra W. Gudimetla, Fountain Hills, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 1607 days.

(21) Appl. No.: 11/688,672

(22) Filed: Mar. 20, 2007

(65) Prior Publication Data

US 2007/0216927 A1    Sep. 20, 2007

Related U.S. Application Data

(60) Provisional application No. 60/783,432, filed on Mar. 20, 2006.

(51) Int. Cl.
*G06F 9/46* (2006.01)
*G06F 15/16* (2006.01)

(52) U.S. Cl.
USPC ............................ 718/101; 709/201; 709/230

(58) Field of Classification Search
USPC ............. 718/1–106; 709/201–203, 223–226, 709/230–232; 707/643–653
See application file for complete search history.

(56) References Cited

U.S. PATENT DOCUMENTS

| | | | | |
|---|---|---|---|---|
| 5,995,964 A | * | 11/1999 | Hoshiina et al. ..................... 1/1 |
| 6,120,553 A | * | 9/2000 | Sidwell ........................... 717/151 |
| 6,131,190 A | * | 10/2000 | Sidwell ........................... 717/115 |
| 6,658,465 B1 | | 12/2003 | Touboul |
| 7,120,825 B2 | * | 10/2006 | Ji et al. ........................... 714/6.31 |
| 7,644,107 B2 | * | 1/2010 | Neagovici-Negoescu et al. ............................ 707/715 |
| 7,685,107 B2 | * | 3/2010 | Smith ............................. 707/758 |
| 7,765,549 B1 | * | 7/2010 | Lauer ............................. 718/101 |
| 2005/0288972 A1 | * | 12/2005 | Marvin et al. ..................... 705/4 |
| 2006/0265426 A1 | * | 11/2006 | Chen ............................. 707/200 |
| 2007/0011208 A1 | * | 1/2007 | Smith ............................. 707/200 |

FOREIGN PATENT DOCUMENTS

EP   0 905 622   3/1999

OTHER PUBLICATIONS

PCT; International Search Report dated Sep. 24, 2007 in Application No. PCT/US2007/006855.
PCT; Written Opinion dated Sep. 24, 2007 in Application No. PCT/US2007/006855.
PCT; International Preliminary Report on Patentability dated Oct. 2, 2008 in Application No. PCT/US2007/006855.

* cited by examiner

*Primary Examiner* — Abdullah Al Kawsar
(74) *Attorney, Agent, or Firm* — Snell & Wilmer L.L.P.

(57) ABSTRACT

Software application that interfaces with a main frame operating a job control language so as to overcome the file limit for processing in the job control language, by dividing files or other data sets into batches that are equal to or less than the limit of the job control language. The software application then provides the batches for processing in the job control language individually, so that the file limit is not exceeded for any processing operation.

9 Claims, 4 Drawing Sheets

Published merge performance on the MVS benchmark for 1286994 records in 220 files.

| Utility | Seconds |
|---|---|
| IBM COBOLE | 141 |
| REXX | 172 |
| Merge Utility | 14 |

Figure 1

SYSTEM AND METHOD FOR AN IMPROVED MERGE UTILITY

CROSS REFERENCE TO RELATED APPLICATIONS

This application claim priority to, and the benefit of, U.S. Provisional Patent Application Ser. No. 60/783,432, filed Mar. 20, 2006, which is hereby incorporated by reference in its entirety.

BACKGROUND OF THE INVENTION

Field of the Invention

The present invention is generally directed to a system, method and software for interfacing with a mainframe (or other computer) and overcoming limits on the number of items (e.g., files, data sets, etc.) that can be processed by the mainframe (e.g., by a program/language operating thereon or in association therewith) in a given job step (i.e., operation). Such processing limits are typically associated with a job control language of the mainframe and/or other programs operating in connection with the mainframe. A mainframe typically executes jobs in steps, and with each step there is typically a limit on the number of files that can be input.

Conventional mainframes and associated utility programs may receive multiple inputs from various sources. Often, one or more inputs provide multiple files which need to be organized, consolidated, merged, and/or copied. Known utility programs are typically used to merge and/or copy files. These utility programs are typically executed in the job control language of the mainframe system.

Merging generally consists of combining multiple files into a single output file. Copying generally involves copying the contents of one file to another, and usually involves using some sort of filtering process. However, the terms are often used interchangeably in the art, and will be referred to together throughout this application and should be understood broadly to cover various operations performed by utility programs. The merging and copying of files is common when the multiple files from one or more input sources are the same or similar in format, such that the data can be combined into a single file. The combination of the various files or groups of data into a single file allows for ease in processing and storing such data. In addition, the merging and copying processes can be used to combine data from different file types/formats into a file with a single format.

Utilities with merging and copying functions are used in industries such as manufacturing, retail, financial, etc. For example, in financial institutions such as American Express, such a utility may be used to merge the files pertaining to a single merchant for end-of-day processing. This involves receiving from one merchant that accepts American Express cards multiple files, each of which contains information on a transaction/purchase in which the customer paid with an American Express card. Each of those files (i.e., transactions) must be processed so as to update the billing information for the corresponding customer and so that payment can be made to the merchant. Alternatively, the financial capture system of a financial institution may use a utility to merge transactions submitted by various partners, so as to send a single file containing the data sets from the various partners to a corresponding clearing and settlement system. In other situations, a combination of both of these scenarios takes place. Thus, the copying and merging of files is an important function to be performed in connection with the subsequent analysis and storage of data from various files or locations.

Conventionally, the merging/copying process may take a long time to complete, given the complicated operations of the utilities being used. With delays in the merging of files, subsequent dependent jobs are also delayed. Also, conventional utilities have limits on the number of files they can merge/copy, which limits are typically a function of the limits of the job control language operating on the mainframe, or other computer (while this application refers to mainframes, one of ordinary skill in the art(s) will appreciate that the invention can operate with other types of computers).

This limit is often inherent to the job control language or other program on which the mainframe runs, and is typically a limit on the number of files or sets of data that can be processed in a single instance. Because the limit is often inherent to the job control language, and the utilities that perform the merging/copying are executed in the job control language, the limit affects the utilities operating on the mainframe.

The potential number of files to be merged by a given mainframe may be large given the financial industry's landscape, and is likely to grow as the industry grows. When the file limit associated with the mainframe is less than the number of files to be merged/copied, the process is further slowed and complicated. For instance, a conventional job control language may have a file merge limit of 350 files or data sets. Once the utility operating in the job control language merges the 350 files, the process stops or an error occurs, and a user must restart the process in order to merge another 350 files. As one may expect, this is a cumbersome and time-consuming process.

Another problem is that many conventional utilities copy files one at a time, which slows the process.

Commercially available utilities are already used by information technology departments in various industries. Examples of known utilities include REXX and IBM COBOLE, among others. Given the foregoing problems, such conventional utilities leave room for improvement with respect to processing times and ease of use.

BRIEF DESCRIPTION OF THE INVENTION

The present invention overcomes the above-identified problems of conventional utilities by providing a system, method and computer program product which has faster and more convenient operation when the number of involved files exceeds the processing limit of the underlying software performing the processing.

In particular, with the present invention, an infinite number of files/sets of data may be used without encountering problems which would otherwise occur due to the limits of the job control language or other piece of software. Further, enhanced speed may be obtained by using dynamic allocation of files and methods such as Basic Direct Access Method (BDAM) access, parallel access, avoiding DASD contention, and controller caching to reduce total CPU time.

In preferred embodiments, the present invention takes the form of a software application that interfaces with the mainframe and job control language so as to overcome the file limit by dividing files or other data sets for processing into batches that are equal to or less than the limit of the mainframe system, and providing the batches one at a time for processing.

A piece of software according to the present invention may be used on its own or in connection with one or more conventional utilities, giving them additional functionality. Specifically, the present invention may take the form of a program that uses a conventional utility to provide the functionality of merging, copying or otherwise processing files in the job control language. In alternative embodiments, software according to the present invention may act as its own utility that provides the processing functionality which operates in the job control language. The operation and programming of such a utility will be understood of one of ordinary skill in the art(s), and therefore, not repeated herein.

In one aspect, the invention involves a system of merging and copying which determines a limit (e.g., file or input limit) of a conventional utility or other program (or job control language), copies/merges to or below the limit, and then automatically repeats the process as many times as necessary to merge/copy all of the files, until an end of the files to be merged/copied is reached. For instance, a conventional utility or job control language may have a 500-file limit for its usage, but the mainframe may receive 10,000 files to be merged or copied. A programmer may set the limit of files to be copied at a time to be less than or equal to the limit of the operating being used, but in preferred embodiments the system determines the limit by reading a parameter file and dynamically allocates a number of files to be copied at a setting less than or equal to the limit. The system will then copy to that setting. In doing so, the utility allocates files to be copied and copies data in "chunks" or "batches" that the mainframe can handle, and then moves to the next chunk/batch of data (de-allocating and re-allocating) until all of the files are processed.

In another preferred embodiment, the present invention is directed to a method of overcoming a limit of a number of files that can be processed in a given operation by a first computer application, using a second computer application which interfaces with the first application. The method involves providing an interface between the first application and the second application, wherein the first application has the limit on the number of files that can be processed in a given operation. The method also sets a batch size in the second application to be less than or equal to the file limit of the first application and divides files to be processed by the first application into a plurality of batches each having the set batch size. Consequently, each batch may be provided individually to the first application for processing of the files of each batch, so as to not exceed the file limit of the first application.

In an additional preferred embodiment, the present invention is directed to a system for overcoming a limit of a number of files that can be processed in a given operation by a job control language, using a computer program. The system includes at least one processor for operating the job control language and the computer program, wherein the job control language has a limit on the number of files that can be processed in a given operation, and the computer program operates in connection with the at least one processor to provide files to be processed in the job control language in batches having a number of files equal to or less than the limit on the number of files for processing in the job control language. The system also includes an input for inputting at least one of a batch size indicating the maximum number of files for a batch and a format of a list file listing all of the files to be processed in the job control language. The at least one processor divides the files to be processed in the job control language into batches, each not exceeding the batch size, in accordance with instructions from the computer program.

To add to the speed of the merging/copying process, the invention may incorporate features such as BDAM access, parallel accessing volumes, avoiding DASD contention, and controller caching. BDAM is part of the access methodology for IBM operating system. BDAM access is a file access method to access sequential files. Parallel accessing can be defined as accessing files as a shared stream of data. A DASD connection can be defined as avoiding device and intra-file contention. Controller caching can be defined as caching to minimize external resources access.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

FIG. 1 is a table comparing the merge performance of one embodiment of the present invention with conventional systems.

DETAILED DESCRIPTION

I. Overview

The present invention is directed to a system, method and computer program product for an improved merge utility. The present invention is now described in more detail herein in terms of the above exemplary improvement over existing. This is for convenience only and is not intended to limit the application of the present invention. In fact, after reading the following description, it will be apparent to one skilled in the relevant art(s) how to implement the following invention in alternative embodiments (e.g., other utilities, other computer systems, etc.).

II. Process

FIG. 1 is a table showing the merge performance on an MVS operating system for 1,286,994 records in 220 files. As can be seen, the "Merge Utility" of the present invention is significantly faster than that of the IBM COBOLE and REXX utilities.

Figure 2:
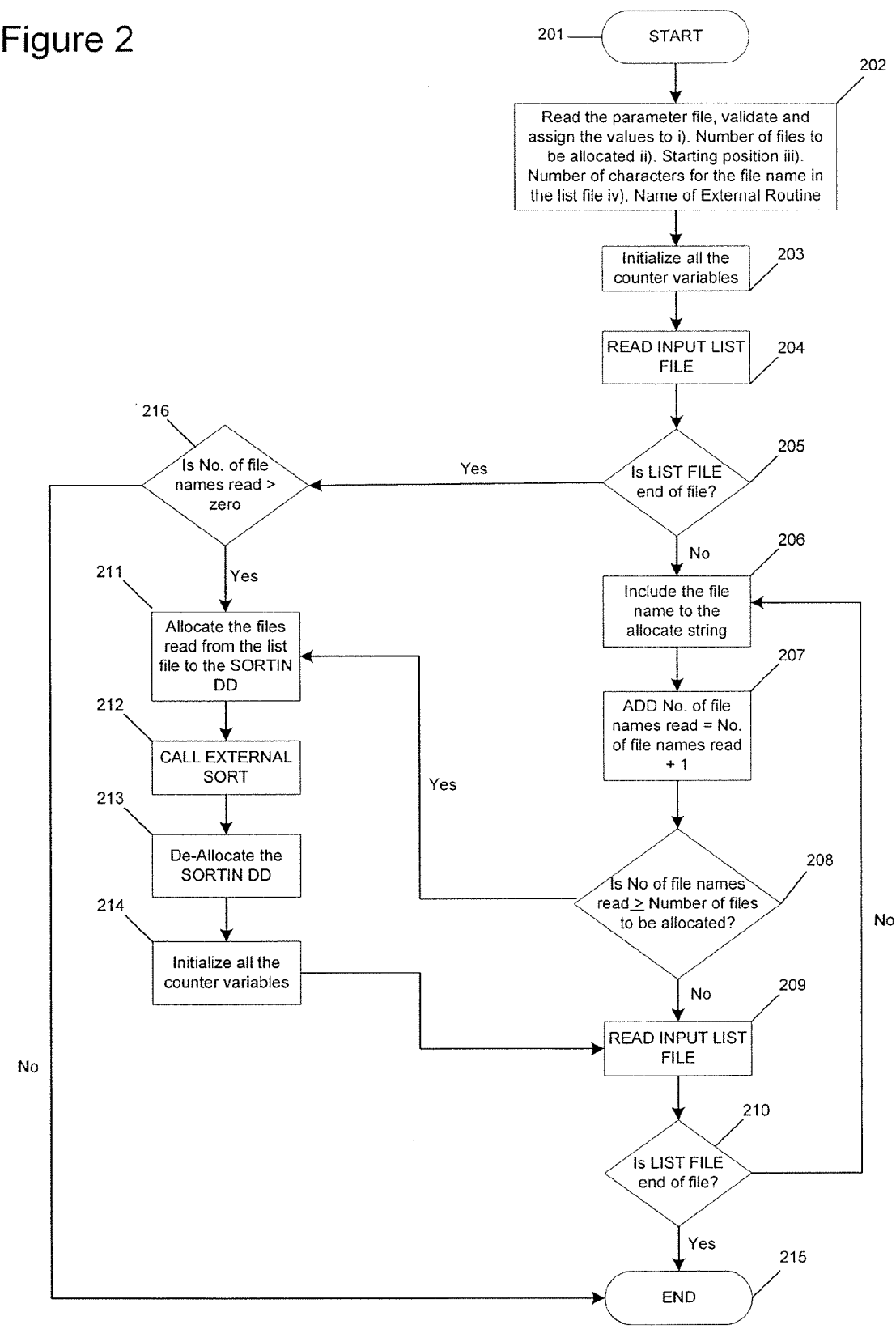
FIG. 2 is a flowchart illustrating a merge/copy process according to one embodiment of the present invention.

FIG. 2 is a flow chart depicting the operation a software application according to one aspect of the present invention.

In step 201, the program starts. The start of the program involves the reading of a parameter file, which takes place in step 202. The parameter file is set up in advance of execution of the program in order to define parameters in which the software will operate. For instance, the parameter file will typically list the number of files to be processed (i.e., allocated). In addition, the parameter file may include information concerning the starting position of each file name in a list file, so that the program knows where to begin reading. Further, the parameter file may indicate the number of characters in the name of the file, so that the program can properly read the file names. Also, in embodiments in which the program itself will not provide the functionality for merging, copying, or otherwise processing the files, the parameter file will identify the external routine to be used in the processing of the files. Thus, the present invention can be used with existing utility programs to enhance their operation to overcome the file processing limits from which the utilities suffer (typically due to the limits of the job control language on which they operate). Of course, in other embodiments, the software of the present invention may include functionality that allows it to operate as the needed utility, as will be appreciated by those of ordinary skill in the art(s).

In general, these parameters preferably allow the program to establish where the information to processed may be found and any formatting information the program may need to process the input list file or the files to be processed.

In step 203, all of the counter variables are initialized, to set any counters being used to initial states so as to properly track progress of the process. In step 204, the input list file is read and inputted. The input list file preferably contains a list of all the files to be allocated and processed. Specifically, the file names of the input file are read one at a time. After reading each file name, it is determined (in step 205) whether the current file being read is the end of the file list (i.e., whether the grouping is the last of the files to be copied/merged).

If the file is not the end of the list of files, the process proceeds to step 206. In that step, the file name just read is added to an allocate string of names of files to be processed by the mainframe. In step 207, the number of file names read in the process is made to equal the number previously read plus one. Thus, the counter that is tracking the number of file names added to the allocate string is increased by one to account for the file name added in step 206. In step 208, the process determines whether the number of file names read is greater than or equal to the number of file names to be allocated in a single batch, as previously defined in step 202 by the parameter file.

In practice, the number of file names read should not be greater than the number of file to be allocated, since this step is performed when each new name is added to the allocate string. Thus, as soon as the allocate string has a number of file names equal to the number to be allocated, the process proceeds to allocation and processing of those files, as will be discussed below.

When the number of file names read is less than the number of files to be allocated, the process proceeds to step 209. In that step, the input list file is again read for the next file name. If there is another file to be read in step 209, the process returns to step 206 (through step 210), and the process is repeated until the number of files in the allocate string equals the number of files to be allocated (i.e., the batch size). Once that happens, in step 208, the batch of files in the allocate string are allocated and processed.

Specifically, in step 211, all of the files read from the list file and added to the allocate string for processing are allocated to the SORTIN DD. More specifically, all the data sets corresponding to those file names are read from the memory in which they are stored for processing. In step 212, the external sort is called; namely, the external routine which is to be used to process the data, as set in step 202, is called for action. This external sort is performed in accordance with the functions defined by the specific utility being used and is executed in the job control language of the mainframe. Because the number of files or data sets in the allocate string is set to be less than the limit for processing in the job control language, the processing of the files can take place without an error or break in the processing.

In step 213, the process de-allocates the SORTIN DD after the processing is complete (for instance, by removing the files being processed from the memory in which they were stored in the allocation). In step 214, the counters used in the process are reset. For instance, the number of files read from the list file and added to the allocate string is set to zero. By so doing, the process can continue with the next batch of files to be allocated. This process continues batch by batch until all the files have been processed. Because each batch is set below the file limit of the job control language, the process can continue unimpeded until completion, without the need for a technician to manually send each batch or restart the utility each time the limit is reached.

Specifically, after step 214, the process returns to step 209 to read the next file name from the list file and, if the end of the list file has not been reached, to start adding to a new allocation string in step 206.

Once all of the batch have been allocated, the process ends in step 215. The end is prompted either through step 205 or 210, each of which determine whether all of the file names from the list file have been read.

In connection with step XX05, if the process has already reached the end of the file, for instance if there is only one filed to be processed, the process proceeds to step 216. In that step, it is determined whether the number of files is greater than zero, to ensure that there is something to be processed (as opposed to having some error in which there are no files listed in the input list file). If there are no files, the process ends immediately. If there is a file to be processed, the process proceeds to step 211 so that the file can be processed in accordance with the external routine, before the process ends.

The program according to the present invention can be run on the mainframe, or called up from a remote location.

The above example process can be further enhanced by the use of BDAM access. BDAM access is an access method that allows for direct processing on files. BDAM files do not have a particular sequence or organization, and are accessed using their disk addresses. Also, the use of parallel accessing may further enhance the processing by providing the ability to access DASD volumes concurrently.

In addition, avoiding DASD contention can also help the process by avoiding the need to define DASD connection.

In addition, controller cache may be used to separate the internal mechanical read/write operations from transfers over the channel, and to hold recently accessed data.

Figure 3:
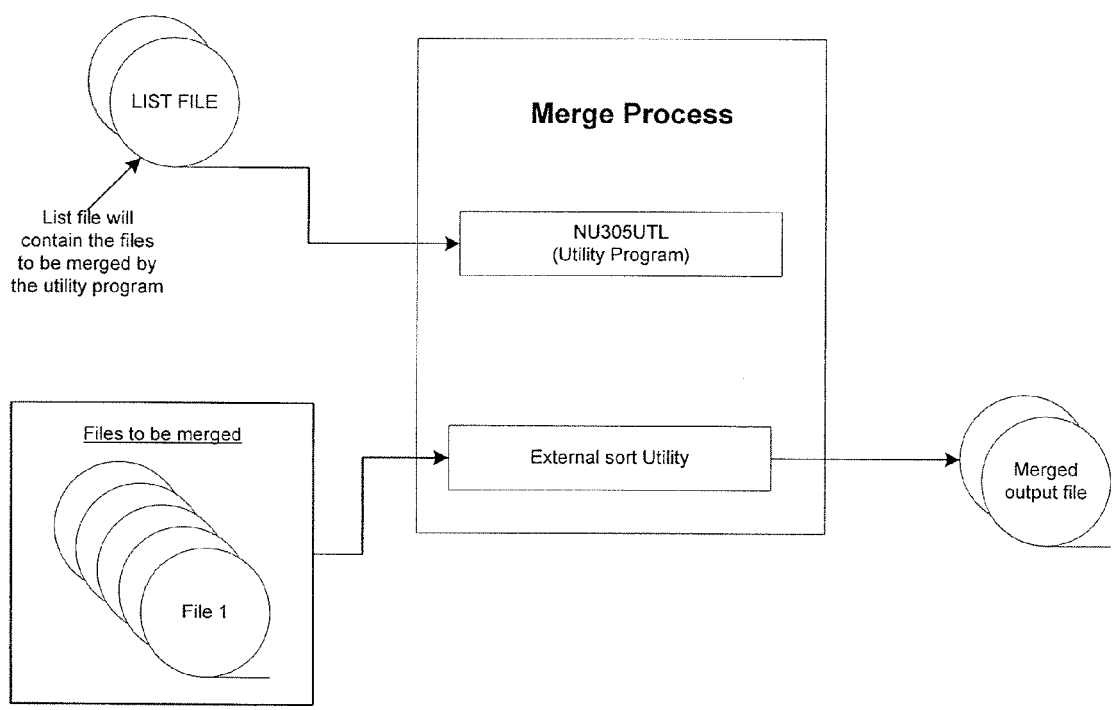
FIG. 3 is a high level flow diagram of a process according to one aspect of the present invention.

FIG. 3 shows a high level flow for a merge process according to one aspect of the present invention. As can be seen, files to be merged go through a merge process involving the Utility Program and External Sort Utility, so as to be combined in a merged output file. Specifically, FIG. 3 shows the existence of the list file which preferably contains the names (and preferably locations) of the files to be merged. The files to be merged are stored separately. The merge process uses the list file to identify and process the files in batches, using the utility program of the present invention and, as shown here, an external sort utility for providing the merge function. The result is the merged output file.

Also provided herein is Annex A, which is software code from an example merge utility according to one aspect of the invention.

Preferably, the present invention takes the form of software code which executes the process to provide the functionality to the mainframe or other computer system. The invention can be embodied in the actual method performed, the hardware implementing the method, and/or a computer-readable memory medium containing the necessary software code. As will be appreciated by one of ordinary skill in the relevant arts, the invention is not limited to the embodiments discussed herein, which are only examples of the implementation of the functions of the present invention.

III. Example Implementations

The present invention or any part(s) or function(s) thereof) may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 4:
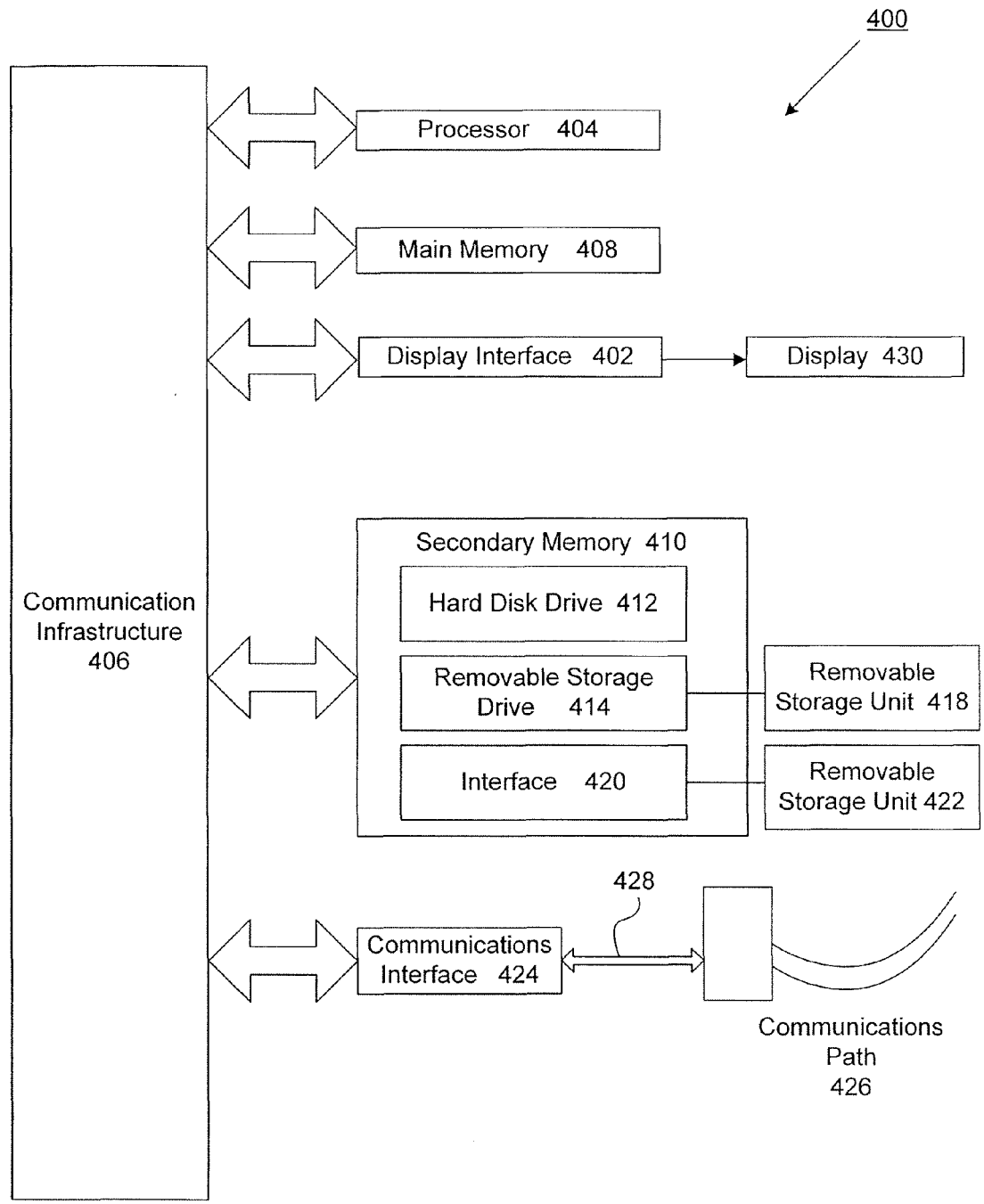
FIG. 4 is a block diagram of an exemplary computer system useful for implementing the present invention.

In fact, in one embodiment, the invention is directed toward one or more computer systems capable of carrying out the functionality described herein. An example of a computer system 400 is shown in FIG. 4.

The computer system 400 (which may take the form of a main frame computer) includes one or more processors, such as processor 404. The processor 404 is connected to a communication infrastructure 406 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 400 can include a display interface 402 that forwards graphics, text, and other data from the communication infrastructure 406 (or from a frame buffer not shown) for display on the display unit 430.

Computer system 400 also includes a main memory 408, preferably random access memory (RAM), and may also include a secondary memory 410. The secondary memory 410 may include, for example, a hard disk drive 412 and/or a removable storage drive 414, representing a floppy disk drive, a magnetic tape drive, an optical disk drive, etc. The removable storage drive 414 reads from and/or writes to a removable storage unit 418 in a well known manner. Removable storage unit 418 represents a floppy disk, magnetic tape, optical disk, etc. which is read by and written to by removable storage drive 414. As will be appreciated, the removable storage unit 418 includes a computer usable storage medium having stored therein computer software and/or data.

In alternative embodiments, secondary memory 410 may include other similar devices for allowing computer programs or other instructions to be loaded into computer system 400. Such devices may include, for example, a removable storage unit 422 and an interface 420. Examples of such may include a program cartridge and cartridge interface (such as that found in video game devices), a removable memory chip (such as an erasable programmable read only memory (EPROM), or programmable read only memory (PROM)) and associated socket, and other removable storage units 422 and interfaces 420, which allow software and data to be transferred from the removable storage unit 422 to computer system 400.

Computer system 400 may also include a communications interface 424. Communications interface 424 allows software and data to be transferred between computer system N00 and external devices. Examples of communications interface 424 may include a modem, a network interface (such as an Ethernet card), a communications port, a Personal Computer Memory Card International Association (PCMCIA) slot and card, etc. Software and data transferred via communications interface 424 are in the form of signals 428 which may be electronic, electromagnetic, optical or other signals capable of being received by communications interface 424. These signals 428 are provided to communications interface 424 via a communications path (e.g., channel) 426. This channel 426 carries signals 428 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 414, a hard disk installed in hard disk drive 412, and signals 428. These computer program products provide software to computer system 400. The invention is directed to such computer program products.

Computer programs (also referred to as computer control logic) are stored in main memory 408 and/or secondary memory 410. Computer programs may also be received via communications interface 424. Such computer programs, when executed, enable the computer system 400 to perform the features of the present invention, as discussed herein. In particular, the computer programs, when executed, enable the processor 404 to perform the features of the present invention. Accordingly, such computer programs represent controllers of the computer system 400.

In an embodiment where the invention is implemented using software, the software may be stored in a computer program product and loaded into computer system 400 using removable storage drive 414, hard drive 412 or communications interface 424. The control logic (software), when executed by the processor 404, causes the processor 404 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

IV. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A method comprising:

reading, by a computer-based system and to overcome a limit on a number of files that an external routine comprising an operating system ("OS") is able to process, a parameter file associated with the OS to determine the number of files that the OS is able to process, wherein the number of files that the OS is able to process is associated with a job control language ("JCL"), and wherein the parameter file indicates a number of characters associated with at least one file in a list file, and wherein the parameter file further identifies the external routine;

setting, by the computer-based system, a batch size that is less than or equal to the limit;

allocating, by the computer-based system and from the list file, a series of files to a batch until a counter that is incremented each time a file from the list file is allocated to the batch has a value that is equal to the batch size;

delivering, by the computer-based system, the batch to the OS;

processing, by the computer-based system running the external routine, the batch;

resetting, by the computer-based system, the counter in response to the processing; and repeating, by the computer-based system, the allocating, delivering, processing, and resetting.

2. The method of claim 1, further comprising delivering, by the computer-based system, the batch individually to the OS as a list file.

3. The method of claim 1, further comprising delivering, by the computer-based system, a plurality of batches to the OS in seriatim.

4. An article of manufacture including a non-transitory, tangible computer readable storage medium having instructions stored thereon that, in response to execution by a computer-based system and to overcome a limit on a number of files that an external routine comprising an operating system ("OS") is able to process, cause the computer-based system to perform operations comprising:

reading, by the computer-based system, a parameter file associated with the OS to determine the number of files that the OS is able to process, wherein the number of files that the OS is able to process is associated with a job control language ("JCL"), and wherein the parameter file indicates a number of characters associated with at least one file in a list file, and wherein the parameter file further identifies the external routine;

setting, by the computer-based system, a batch size that is less than or equal to the limit;

allocating, by the computer-based system and from the list file, a series of files to a batch until a counter that is incremented each time a file from the list file is allocated to the batch has a value that is equal to the batch size;

delivering, by the computer-based system, the batch to the OS;

processing, by the computer-based system running the external routine, the batch;

resetting, by the computer-based system, the counter in response to the processing; and repeating, by the computer-based system, the allocating, delivering, processing, and resetting.

5. The article of claim 4, further comprising delivering, by the computer-based system, the batch individually to the OS as a list file.

6. The article of claim 4, further comprising delivering, by the computer-based system, a plurality of batches to the OS in seriatim.

7. A system comprising:

a processor that overcomes a limit on a number of files that an external routine comprising an operating system ("OS") is able to process, a tangible, non-transitory memory configured to communicate with the processor, the tangible, non-transitory memory having instructions stored thereon that, in response to execution by the processor, cause the processor to perform operations comprising:

reading, by the processor, a parameter file associated with the OS to determine the number of files that the OS is able to process, wherein the number of files that the OS is able to process is associated with a job control language ("JCL"), and wherein the parameter file indicates a number of characters associated with at least one file in a list file, and wherein the parameter file further identifies the external routine;

setting, by the processor, a batch size that is less than or equal to the limit;

allocating, by the processor and from the list file, a series of files to a batch until a counter that is incremented each time a file from the list file is allocated to the batch has a value that is equal to the batch size;

delivering, by the processor, the batch to the OS;

processing, by the processor running the external routine, the batch;

resetting, by the processor, the counter in response to the processing; and repeating, by the processor, the allocating, delivering, processing, and resetting.

8. The system of claim 7, further comprising delivering, by the processor, the batch individually to the OS as a list file.

9. The system of claim 7, further comprising delivering, by the processor, a plurality of batches to the OS in seriatim.

* * * * *